(12) United States Patent
Wienke et al.

(10) Patent No.: US 8,158,228 B2
(45) Date of Patent: Apr. 17, 2012

(54) LAMINATE

(75) Inventors: Dietrich D. Wienke, Elsloo (NL); Roelof R. Marissen, Born (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 12/296,334

(22) PCT Filed: Apr. 12, 2007

(86) PCT No.: PCT/EP2007/003246
§ 371 (c)(1),
(2), (4) Date: Nov. 6, 2009

(87) PCT Pub. No.: WO2007/115833
PCT Pub. Date: Oct. 18, 2007

(65) Prior Publication Data
US 2010/0159168 A1    Jun. 24, 2010

(30) Foreign Application Priority Data
Apr. 12, 2006    (EP) .................................. 06007690

(51) Int. Cl.
B29C 70/08 (2006.01)
B29D 22/00 (2006.01)
B29D 23/00 (2006.01)
B32B 1/08 (2006.01)

(52) U.S. Cl. .................. 428/36.3; 428/35.7; 428/297.4; 428/298.1; 428/299.7; 428/311.11; 428/311.51; 428/318.6; 428/318.4; 428/340; 428/220

(58) Field of Classification Search ................ 428/35.7, 428/36.3, 297.4, 298.1, 299.7, 311.11, 311.51, 428/318.6, 318.4, 340, 220
See application file for complete search history.

(56) References Cited

U.S. PATENT DOCUMENTS

| 3,728,464 | A | 4/1973 | Griffing |
| 4,143,197 | A | 3/1979 | Jasionowicz et al. |
| 5,180,190 | A | 1/1993 | Kersey et al. |
| 6,004,891 | A | 12/1999 | Tuppin et al. |
| 6,054,205 | A | 4/2000 | Newman et al. |
| 6,670,291 | B1 | 12/2003 | Tompkins et al. |

FOREIGN PATENT DOCUMENTS

| CN | 2471532 | | 1/2002 |
| DE | 41 13 301 | | 10/1992 |
| EP | 0205960 | A2 * | 12/1986 |
| JP | 09-024568 | | 1/1997 |
| WO | 03/042622 | | 5/2003 |
| WO | 2004/039565 | | 5/2004 |

OTHER PUBLICATIONS

International Search Report for PCT/EP2007/003246, mailed Aug. 2, 2007.

* cited by examiner

Primary Examiner — Michael C Miggins
(74) Attorney, Agent, or Firm — Nixon & Vanderhye P.C.

(57) ABSTRACT

Laminate containing a first layer and a second layer attached to the first layer, said second layer comprising high tenacity yarns, characterized in that the first layer is made out of a material selected out of the group consisting of a metal, a plywood, a solid thermoplastic or thermosetting polymer, and a composite material containing carbon fibers and/or glass fibers, and the high tenacity yarns have a tenacity of at least 0.5 GPa and are positioned in a grid structure. The laminate is damage resistance and is suitably used for the manufacture of air freight containers.

9 Claims, 1 Drawing Sheet

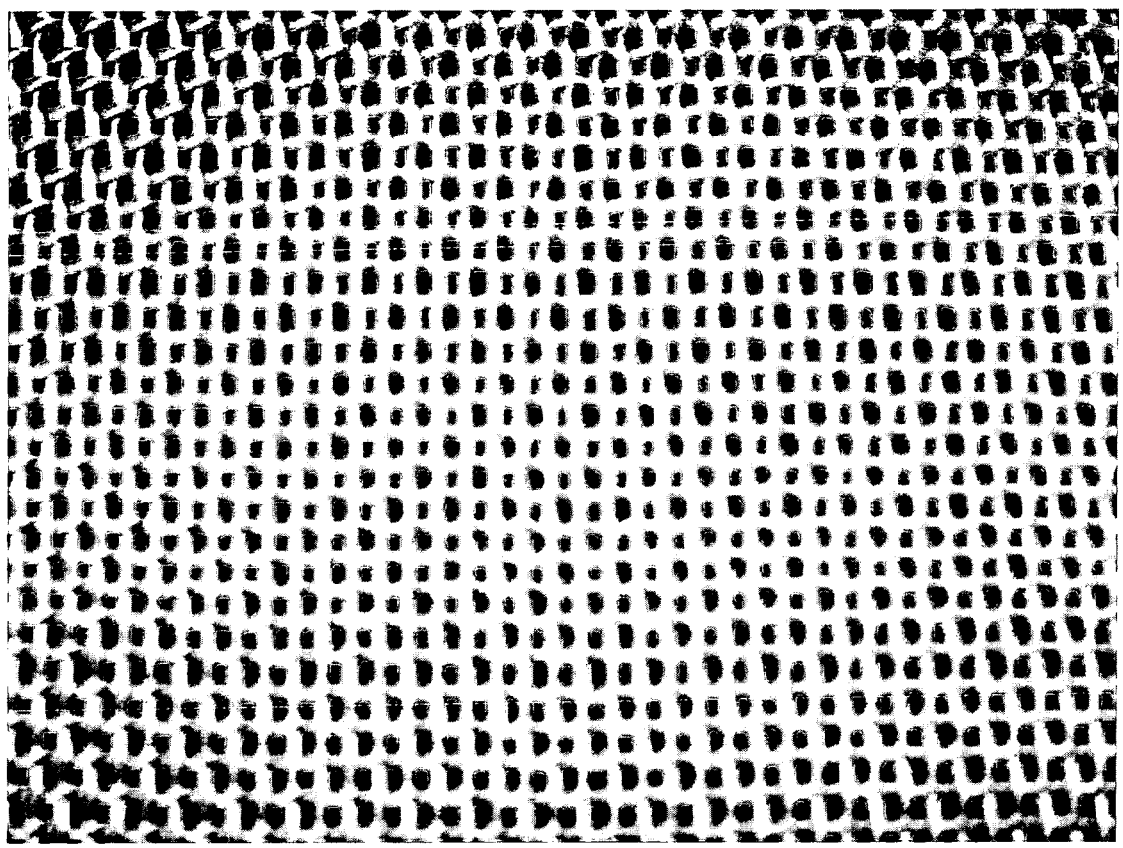

LAMINATE

FIELD

This application is the U.S. national phase of International Application No. PCT/EP2007/003246, filed 12 Apr. 2007, which designated the U.S. and claims priority to Europe Application No. 06007690.8, filed 12 Apr. 2006, the entire contents of each of which are hereby incorporated by reference.

The invention relates to a laminate containing a first layer and a second layer attached to the first layer said second layer comprising high tenacity yarns.

BACKGROUND AND SUMMARY

Such a laminate is known from U.S. Pat. No. 5,180,190. In this patent a container for the transportation of fluids is described. The wall of the container has a laminate structure, containing a first layer, basically forming the wall of the container. On top of the first layer a second layer is attached containing a fabric of high tenacity yarns and a matrix. The matrix adheres to the yarns and to the first layer.

Object of the second layer is to improve the damage resistance of the container.

The known laminate has the disadvantage of having an unsatisfactory damage resistance. Especially if the laminate is hit with a large blunt object the damage is severe, due to tearing of the fabric over large distances, also referred to as cascade damage. Damaging of this kind often occurs. For example it may occur that while handling the container, the wall of the container is hit by a forklift truck. By hitting the container wall the fork breaks the single yarns sequentially, both in the warp and weft direction and in the subsequent layers if present.

Object of the invention is to provide a laminate having improved damage resistance.

Surprisingly this object is obtained by providing a laminate containing a first layer and a second layer attached to the first layer said second layer comprising high tenacity yarns having a tenacity of at least 0.5 GPa, wherein the high tenacity yarns are positioned in a grid structure.

The laminate according to the invention is very well damage resistant. The laminate according to the invention is especially resistant against cascade damage.

A further advantage of the laminate according to the invention is that it has a low weight, so that it is very suitable for use in the construction of mobile, light weight constructions, for example air freight containers.

It was further surprisingly found that the laminate of the invention when compared with known laminates, it has a higher energy absorption when impacted by fast moving objects, i.e. objects moving with a velocity of higher than 40 m/s which are due to, for example, an explosion or blast occurring in the vicinity of the laminate.

Moreover the laminate may be produced in various designs, to fulfill all kind of demands, determined by its intended use.

BRIEF DESCRIPTION OF THE DRAWING

FIG. 1 is a photograph of yarns comprising ultra-high molecular weight polyethylene filaments, the yarn being positioned in a grid structure.

DETAILED DESCRIPTION

The function of the first layer often is to provide stiffness to the laminate. Therefore, the bending modulus of the first layer is preferably at least 10 GPa, more preferably at least 30 GPa, even more preferably at least 50 GPa, most preferably at least 70 GPa. The first layer may be of a metal, for instance aluminum, an alloy comprising magnesium etc. The first layer may be of plywood, preferably birch plywood. It is also possible that the first layer is of a sandwich structure or a honeycomb structure.

Preferably the first layer contains a thermoplastic or a thermosetting polymer. So good results are obtained if the first layer is of polypropylene, of polycarbonate or of a thermoplastic polyester. Even more preferably the first layer is of a composite material, containing carbon fibers and/or glass fibers and a thermosetting polymer. Good examples of such thermosetting polymers are epoxy resin, polyurethane resin, unsaturated polyester resin, vinyl ester resin. Most preferably the first layer is of a composite material comprising carbon fibers and an epoxy resin or a vinyl ester resin. The skilled person knows how to choose the thickness, the stiffness and further parameters of the first layer to adapt it to its intended use.

Examples of the high tenacity yarns in the second layer are yarns containing aramid filaments, filaments of S-glass, filaments of high tenacity polyester and yarns comprising ultra-high molecular weight polyethylene filaments.

Yarns comprising aramid filaments are for example sold under the trade name Kevlar™ and Twaron™. Yarns comprising high tenacity polyester filaments are for example sold under the trade name Vectran™, yarns comprising ultra-high molecular weight polyethylene filaments are for example sold under the trade name Dyneema™ and Spectra™.

Preferably yarns comprising ultra-high molecular weight polyethylene filaments are used in the second layer as the high tenacity yarns that are positioned in the grid structure. Such yarns are preferably produced according to the so-called gel-spinning process as for example described in EP 0205960 A, EP 0213208 A1, U.S. Pat. No. 4,413,110, GB 2042414 A, EP 0200547 B1, EP 0472114 B1, WO 01/73173 A1, and Advanced Fiber Spinning Technology, Ed. T. Nakajima, Woodhead Publ. Ltd (1994), ISBN 1-855-73182-7, and references cited therein. Gel spinning is understood to include at least the steps of spinning at least one filament from a solution of ultra-high molecular weight polyethylene in a spin solvent; cooling the filament obtained to form a gel filament; removing at least partly the spin solvent from the gel filament; and drawing the filament in at least one drawing step before, during or after removing spin solvent. Suitable spin solvents include for example paraffins, mineral oil, kerosene or decalin. Spin solvent can be removed by evaporation, by extraction, or by a combination of evaporation and extraction routes.

The ultra-high-molecular weight linear polyethylene used for the preparation of the filaments may have a weight average molecular weight of at least 400,000 g/mol.

The high tenacity yarns preferably have a tenacity of at least 1 GPa, still more preferably at least 1.5 GPa, most preferably at least 2 GPa.

In the grid structure the distance between the centrelines of adjacent yarns in the grid is larger than the diameter of a yarn. This means that there always is a certain distance between the surfaces of two adjacent yarns in the grid. Preferably the distance between the centrelines of two adjacent yarns in an array is equal to or larger than 1.25 times the diameter of a yarn, more preferably larger than 1.5 times the diameter of a yarn, more preferably larger than 2 times the diameter of a yarn, most preferably larger than 2.5 times the diameter of a yarn. Because of this a laminate having a very high damage resistance is obtained.

The yarns may be positioned in the grid structure in various ways. For example it is possible to make an open fabric, having the grid structure, and to apply the fabric into the laminate. Another possibility is to make a net.

It is even possible to produce the grid structure of the high tenacity yarns by producing a fabric comprising arrays of the high tenacity yarns, the openings in the grid between the high tenacity yarns being filled with other yarns.

It is preferably to lay the yarns in a grid structure, immediately in place on top of the first layer.

Preferably the grid structure is formed by two or more arrays of parallel yarns, the angle between the yarns of the arrays being larger than 0°, preferably larger than 45° more preferably larger than 60°, more preferably larger than 89°, most preferably the angle is 90°. Most preferably the grid structure is formed by two or more arrays of parallel yarns. The skilled person knows how to produce and put in place such arrays.

The yarn may have a titre of between 800 and 35000 dtex.

If yarns comprising ultra-high molecular weight polyethylene filaments are used the yarns preferably have a titre of between 1000 and 18000 dtex, more preferably between 5000 and 15000 dtex, most preferably between 8000 and 12000 dtex. In this way a good balance is obtained between damage resistance and weight of the laminate.

Good results are obtained if the second layer contains between 200 and 2000 grams of the high tenacity yarns per square meter, the yarns being positioned in a grid structure. Preferably the second layer contains between 200 and 1000 grams of the high tenacity yarns per square meter, more preferably between 300 and 600 grams per square meter.

Good results are obtained if the thickness of the second layer is smaller than 3 times the diameter of a yarn. Preferably the thickness is less than 2 times the diameter of a yarn. In this way a laminate having a very high damage resistance and yet a low weight is obtained.

The second layer comprising the high tenacity yarns may be attached to the first layer in several ways. For example it may be nailed or glued to the first layer. Preferably the second layer contains a matrix that adheres to the yarns and to the first layer. Examples of suitable materials to constitute the matrix include epoxy resin, vinyl ester resin or ethylene vinyl acetate copolymer (EVA).

A very good laminate according to the invention, having a very light weight, being very stiff and having a very high damage-resistance contains a first layer comprising carbon fibers and a thermosetting polymer and contains a second layer containing yarns containing ultra-high molecular weight polyethylene filaments and a thermosetting polymer.

The carbon fibers in the first layer preferably form a fabric. However, the carbon fibers may also be arranged in other configurations as for example a grid structure, a felt or as chopped carbon fibers.

Preferably the first layer and of the second layer comprise the same polymer.

The invention also relates to a construction containing the laminate according to the invention.

Good examples of applications for the laminate include a radar dome, tanks for fluid transportation, especially for the transportation of dangerous fluids, like for instance petrol.

A preferred example is a device for air transportation comprising the laminate according to the invention. Good examples are an air freight container and the cargo hole liner in the cargo hole of an air plane. Such liners protect the inner wall of the air plane from being damaged for example when the air plane is loaded with freight, due to impacts by collision of freight pieces against the inner wall.

It was surprisingly found that an air freight container comprising the laminate of the invention presents an increased blast resistance, i.e. an increased damage resistance to an explosion or blast occurring inside or outside said container.

A further advantage of the air freight container of the invention is that for the same blast resistance as the known containers, it is of much lighter weight. Yet a further advantage of the air freight container of the invention is that it can be easily shaped to suit the interior of the carrying aircraft. Additionally, said container is cheaper to produce and maintain than known containers which provide the same blast resistance.

Preferably the grid is located at the side of impact of the structure. For a container this is on the outside. For a liner of a cargo hole this is the side directed to the inside of the air plane.

The invention is further explained in the figure. FIG. 1 shows a photograph of yarns comprising ultra-high molecular weight polyethylene filaments (Dyneema™ SK75 of 14080 dtex), the yarn being positioned in a grid structure. The grid structure is obtained by producing an open, plain weave fabric with 2.5 yarns per cm in both the warp and weft direction. The angle between the parallel arrays of yarns is 90°.

EXAMPLE 1

A double laid of Dyneema® SK75 fiber of 5280 dtex is arranged in a rectangular symmetrical plain grid of 2.5 bundles per centimeter in both directions. The distance in the grid between the centerlines of two adjacent yarns is about 2 times the diameter of one yarn, so that the openings in the grid have a size of about equal to the diameter of one yarn. The grid is combined with a carbon fiber fabric into a flat panel plate arrangement using a standard vinylester based resin. The vinylester based resin is applied as the matrix for both the carbon fiber fabric and the grid. After curing of the vinylester based resin a stiff, thin and impact resistant laminate of about 3 mm thickness having a grid like surface pattern is obtained. This laminate has a weight of about 1 kg per square meter. A panel is cut out of the laminate and is mounted into an air cargo container frame. The container is filled with 600 kg mass usually coming from metal blocks simulating air cargo freight. A two-forklift electrical powered medium sized truck, drives from several distances ranging from 0.0 meters up to 2.5 meters with full acceleration against the panel. The panel withstands at least a hit from 1.5 meters distance.

Once a hole is punched into the panel, the forklift truck will not be able to tear a larger hole by lifting the entire 600 kg loaded container.

Comparative Experiment A

Example 1 was repeated, however instead of a double laid grid of the Dyneema® SK75 fiber a densely woven fabric of SK75 fiber was used, having an aerial density of, which equals the amount of Dyneema® SK75 per surface unit used in example 1.

Already hit by the two-forklift truck from a distance of 1 meter considerable damage resulted. Furthermore upon lifting the container a considerable amount of cascade damage was obtained.

Comparative Experiment B

Example 1 was repeated, however instead of the laminate an aluminium panel of 0.7 mm thickness and a weight of 1.9 kg per square meter was used. The panel did not even withstand a hit by the two-forklift truck from a distance of 0.5 m.

EXAMPLE 2

The velocity at which there is a 50% probability that a bullet will perforate the laminate (V50) and the specific energy absorption (SEA) of the laminate of Example 1 were determined at 21° C. with test procedures according to STANAG 2920, using steel Fragment Simulating Projectiles (FSP) of 1.1 gram. After conditioning at about 21° C. and about 65% relative humidity during about 24 hours, the laminate was fixed using flexible straps on a support filled with Roma Plastilin backing material, which was preconditioned at 35° C. The areal density (AD) of the laminate was 1.3 g/m².

The V50 was found to be 170 m/s at an SEA of 12.23 J·m²/kg.

Comparative Experiment C

An aluminum plate of F220 quality (thickness 0.8 mm) with an AD of 2.1 g/m² was subjected to the same test procedure as in Example 2.

The V50 of the aluminum plate was found to be 110 m/s at an SEA of 3.17 J·m²/kg.

The values of the SEA for the laminate of Example 1 and the aluminum plate show that the aluminum plate has a blast resistance almost 4 times smaller than the laminate of Example 1.

The invention claimed is:

1. A laminate comprising:
   a first layer; and
   a second layer attached to the first layer, wherein
   the second layer comprises between 300 and 2000 grams of high tenacity yarns per square meter, and wherein
   the first layer is made out of a material selected out of the group consisting of a metal, a plywood, a thermoplastic or thermosetting polymer, and a composite material containing carbon fibers and/or glass fibers, and wherein
   the high tenacity yarn have a tenacity of at least 0.5 GPa and are positioned in a grid structure wherein in the grid structure the distance between centerlines of adjacent yarns in the grid is larger than a diameter of a yarn.

2. The laminate according to claim 1, wherein the first layer has a bending modulus of at least 10 GPa.

3. The laminate according to claim 1, wherein the high tenacity yarn contains aramid filaments, filaments of S-glass, filaments of high tenacity polyester.

4. The laminate according to claim 1, wherein the high tenacity yarn contains filaments of ultra-high molecular weight polyethylene.

5. The laminate according to claim 1, wherein the grid structure is formed by two or more arrays of parallel yarns, the angle between the yarns of the arrays being larger than 0°.

6. The laminate according to claim 1, wherein the high tenacity yarn has a thickness of between 800 and 35000 dtex.

7. Construction for air transportation, the construction containing a laminate according to claim 1.

8. An air freight container comprising the laminate according to claim 1.

9. A cargo hole liner comprising the laminate according to claim 1.

* * * * *